Patented Dec. 3, 1940

2,223,886

UNITED STATES PATENT OFFICE 2,223,886

PROCESS FOR PREPARING ZINC FORMALDEHYDE SULPHOXYLATE

Frederick B. Downing, Penns Grove, N. J., assignor to E. I. du Pont de Nemours & Company, Wilmington, Del., a corporation of Delaware No Drawing. Application December 6, 1939, Serial No. 307,920

4 Claims. (Cl. 260—429)

This invention relates to the manufacture of anhydrous zinc formaldehyde sulphoxylate, and more particularly to the preparation of zinc formaldehyde sulphoxylate from sodium formaldehyde sulphoxylate.

The ordinary process for the manufacture of anhydrous zinc formaldehyde sulphoxylate consists of the following steps: zinc dust suspended in water is converted to zinc hydrosulphite by reacting with sulphur dioxide:

$$2Zn + 4SO_2 \rightarrow 2ZnS_2O_4$$

The resulting zinc hydrosulphite solution containing an excess of the salt in suspension is treated with formaldehyde to obtain a mixture of zinc formaldehyde sulphoxylate and zinc formaldehyde bisulphite, according to the following equation:

$$2ZnS_2O_4 + 4CH_2O + 2H_2O \rightarrow$$
$$Zn(HSO_2.CH_2O)_2 + Zn(HSO_3.CH_2O)_2$$

Zinc formaldehyde sulphoxylate crystals are separated from the reaction mixture by evaporation and cooling. Now, whereas zinc formaldehyde sulphoxylate is a highly desirable product, the co-product obtained therewith, namely zinc formaldehyde bisulphite is of little commercial value, and accordingly in the interests of economy, the process includes the following additional steps for the conversion of the remaining bisulphite into a more useful product. The mother liquor containing principally zinc formaldehyde bisulphite is reduced with zinc dust to basic zinc formaldehyde sulphoxylate; thus, $$Zn(HSO_3.CH_2O)_2 + 2Zn + 2H_2O \rightarrow$$
$$2Zn(OH)(HSO_2.CH_2O) + Zn(OH)_2$$

The products of this reaction are both insoluble in water, and since basic zinc formaldehyde sulphoxylate like the bisulphite is of little importance commercially, a final conversion and separation is effected by digesting the mixture of basic salt and zinc hydroxide with sodium hydroxide. Zinc hydroxide remains unaffected by this treatment while basic zinc formaldehyde sulphoxylate reacts with sodium hydroxide to yield water-soluble sodium formaldehyde sulphoxylate according to the equation:

$$2Zn(OH)(HSO_2.CH_2O) + 2NaOH \rightarrow$$
$$2Na(HSO_2.CH_2O) + 2Zn(OH)_2$$

The zinc hydroxide is removed by filtration and the filtrate is evaporated to dryness in order to obtain sodium formaldehyde sulphoxylate.

Thus it will be observed that the ordinary process for the manufacture of anhydrous zinc formaldehyde sulphoxylate entails the production of large quantities of sodium formaldehyde sulphoxylate which, while it is marketable, is still not nearly so valuable as the zinc salt. A further defect in this process is that the yield of principal product, i. e., anhydrous zinc formaldehyde sulphoxylate, is not satisfactory. Theoretically the process should result in the production of one mole of zinc formaldehyde sulphoxylate per two moles of sodium formaldehyde sulphoxylate, but due to oxidation occurring during the process and to the losses occasioned by the virtual impossibility of obtaining a clear cut separation through fractional crystallization of the viscous solution of reaction products, the yield is actually only about 50% of theory.

These difficulties would be overcome if sodium formaldehyde sulphoxylate could be changed to the desired zinc formaldehyde sulphoxylate. In aqueous solution these compounds differ from each other only in that one is a sodium salt while the other is a zinc salt; hence it would appear that the conversion of one to the other would be a simple matter. The fact is, however, that while the zinc salt can be converted to the sodium salt by the action of sodium hydroxide, no satisfactory method has heretofore been found for effecting the reverse conversion. When sodium formaldehyde sulphoxylate is reacted with zinc hydroxide, insoluble basic zinc formaldehyde sulphoxylate results.

This invention therefore has as an object an improved process for the production of anhydrous zinc formaldehyde sulphoxylate. A further object is the provision of steps whereby a water-soluble salt of formaldehyde sulphoxylic acid other than the zinc salt whose cation forms a water-insoluble fluosilicate is converted to zinc formaldehyde sulphoxylate. A still further object is the provision of a practical process for converting sodium formaldehyde sulphoxylate to anhydrous zinc formaldehyde sulphoxylate. These and other objects will more clearly appear hereinafter.

These objects are accomplished by the following invention which comprises converting a water-soluble salt such as the sodium salt of formaldehyde sulphoxylic acid to zinc formaldehyde sulphoxylate by means of zinc fluosilicate.

It has been found that when there is added to an aqueous solution of sodium formaldehyde sulphoxylate, such as that resulting after the removal of zinc hydroxide in the ordinary process, an equivalent quantity of zinc fluosilicate, the following reaction takes place:

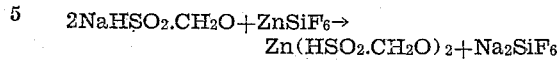

Sodium fluosilicate being insoluble in water is removed by filtration, while zinc formaldehyde sulphoxylate being soluble in water remains in the filtrate from which it can be recovered in any convenient manner. For example, the filtrate can be evaporated to dryness to obtain zinc formaldehyde sulphoxylate as a solid cake; or it can be mixed with a water-miscible organic solvent or with a suitable inorganic salt to precipitate out the zinc formaldehyde sulphoxylate. The preferred method, however, consists in adding the filtrate to the mixture of zinc formaldehyde sulphoxylate and zinc formaldehyde bisulphite obtained by coupling zinc hydrosulphite with formaldehyde, and crystallizing "Sulfoxite" S in the normal manner. The quantity of zinc formaldehyde sulphoxylate recovered by this method is the sum of the amount in the filtrate plus the amount contained in the mixture less the usual loss incident to crystallization. In this way anhydrous zinc formaldehyde sulphoxylate of excellent crystalline structure and purity is obtained. The sodium formaldehyde sulphoxylate obtainable from the mother liquor may be recovered as such or it may be converted to zinc formaldehyde sulphoxylate and recovered as crystals in the next cycle of operation.

It will be noted that according to the method of this invention both the zinc and the sodium formaldehyde sulphoxylates can be produced if desired, but by continuing the cycle of operations described above zinc formaldehyde sulphoxylate alone can be manufactured without actually isolating sodium formaldehyde sulphoxylate.

The preferred form of the invention is illustrated by the following example, wherein parts are by weight:

*Example*

An aqueous solution containing 618 parts of sodium formaldehyde sulphoxylate obtained by sodiating basic zinc formaldehyde sulphoxylate as hereinbefore described is neutralized by the addition of 20% fluosilicic acid to the point where it is no longer alkaline to Brilliant Yellow paper but is still alkaline to litmus paper. Four hundred fifteen (415) parts of zinc fluosilicate is run in with agitation and the charge is cooled to 20°–25° C. in the course of one hour. It is then pumped through a filter press and the press cake consisting substantially of sodium fluosilicate is washed with cold water and the wash water is combined with the filtrate.

The filtrate plus wash water is now pumped to an enamel evaporator and evaporated under 60–80 mm. pressure and 40°–50° C. until the specific gravity of the solution is 1.34. This solution is cooled to 30° C. and again filtered, the sludge being discarded. The filtrate contains 512 parts of zinc formaldehyde sulphoxylate. Evaporation of this aqueous solution to obtain solid zinc formaldehyde sulphoxylate tends to the formation of a hydrated salt in place of the anhydrous salt. It is therefore expedient to isolate the salt from its solution in the following manner:

By the ordinary process of manufacture of zinc formaldehyde sulphoxylate from zinc hydrosulphite and formaldehyde as described above, a plant charge yielded about 610 parts of zinc formaldehyde sulphoxylate and 1650 parts of sodium formaldehyde sulphoxylate.

By adding the solution of 512 parts of zinc formaldehyde sulphoxylate, obtained as above by reacting 618 parts of sodium formaldehyde sulphoxylate and 415 parts of zinc fluosilicate, to the plant charge during the initial crystallization step, i. e., prior to the reduction of zinc formaldehyde bisulphite, and running to completion, 1010 parts of anhydrous zinc salt and 1765 parts of sodium salt were recovered. The zinc formaldehyde sulphoxylate was beautifully crystalline, 97.4% pure, and contained 0.52% insoluble matter.

Assuming that 618 parts of sodium formaldehyde sulphoxylate had been on hand before either charge was run, the following quantities of the sodium and zinc salts were available after the charge by the normal or ordinary process had been completed:

|  | Parts |
|---|---|
| Sodium formaldehyde sulphoxylate, 618+1650= | 2268 |
| Zinc formaldehyde sulphoxylate | 610 | or 3.72 parts of sodium salt for every part of zinc salt.

On the other hand, after the completion of the charge by the process of this invention the following quantities were on hand:

|  | Parts |
|---|---|
| Sodium formaldehyde sulphoxylate | 1765 |
| Zinc formaldehyde sulphoxylate | 1010 | or 1.75 parts of sodium salt for every part of zinc salt.

It will be observed that the improvement in the ratio of zinc salt to sodium salt obtained by the fluosilicate method was 53%. The ratio could be increased indefinitely by continuing to convert sodium formaldehyde sulphoxylate to zinc formaldehyde sulphoxylate as it is produced.

Zinc fluosilicate is readily prepared by adding a slight excess of zinc oxide, hydroxide or carbonate to a solution of fluosilicic acid. It can also be obtained by adding a slight deficiency of fluosilicic acid to a water suspension of zinc oxide, hydroxide or carbonate. The undissolved material in either case is removed by filtration. The strength of the zinc fluosilicate solution preferred for this process lies between 20 and 34% by weight.

It is to be understood that the above example is for purposes of illustration only and that the invention is not limited to the exact conditions or to the reagents therein recited, but is susceptible to wide variation. For instance, zinc formaldehyde sulphoxylate can be prepared from any salt of formaldehyde sulphoxylic acid whose cation forms a water-insoluble fluosilicate, such as potassium and calcium. Conversely, salts of formaldehyde sulphoxylic acid other than zinc formaldehyde sulphoxylate can be made from the sodium salt provided that the cation forms a water-soluble fluosilicate, such as magnesium.

The temperature may be varied within wide limits but it is preferable to carry out the process of this invention within the range of about 15° C. to about 100° C. Above 100° C. the rate of decomposition becomes significant, and to cool the reaction mass below about 15° C. is not economical in plant practice.

This invention has particular application to sodium formaldehyde sulphoxylate obtained in the course of practice of the ordinary process for preparing zinc formaldehyde sulphoxylate, but it is equally as well adapted to the treatment of sodium formaldehyde sulphoxylate, irrespective of its source, or the method by which it is prepared.

Having fully described my invention I claim:

1. A process for preparing anhydrous zinc formaldehyde sulphoxylate which comprises reacting in aqueous solution a water-soluble formaldehyde sulphoxylate of the formula $M(HSO_2.CH_2O)_n$, wherein M is a metal cation which forms a water-insoluble fluosilicate and $n$ is an integer corresponding to the valence of M, with zinc fluosilicate, whereby zinc formaldehyde sulphoxylate and a water-insoluble fluosilicate is formed, removing the fluosilicate, and isolating the zinc formaldehyde sulphoxylate from its aqueous solution.

2. A process which comprises reacting sodium formaldehyde sulphoxylate with zinc fluosilicate and isolating the zinc formaldehyde sulphoxylate formed.

3. A process which comprises reacting sodium formaldehyde sulphoxylate and zinc fluosilicate in aqueous medium, filtering out the sodium fluosilicate formed, and isolating zinc formaldehyde sulphoxylate from the filtrate by crystallization.

4. A process for preparing anhydrous zinc formaldehyde sulphoxylate which comprises adding to an aqueous solution of sodium formaldehyde sulphoxylate an equivalent quantity of zinc fluosilicate whereby water-soluble zinc formaldehyde sulphoxylate and water-insoluble sodium fluosilicate are formed, filtering to remove sodium fluosilicate, adding the filtrate to a mixture of zinc formaldehyde sulphoxylate and zinc formaldehyde bisulphite obtained by reacting zinc hydrosulphite with formaldehyde, and isolating zinc formaldehyde sulphoxylate from the resulting mixture by crystallization.

FREDERICK B. DOWNING.